April 16, 1940.  A. L. COOPER  2,197,204
MEANS FOR WEIGHING MATTER IN A LIQUID VEHICLE
Filed Dec. 13, 1937  5 Sheets-Sheet 1

Inventor
A. L. Cooper.
By T Homer S Sweet,
Attorney

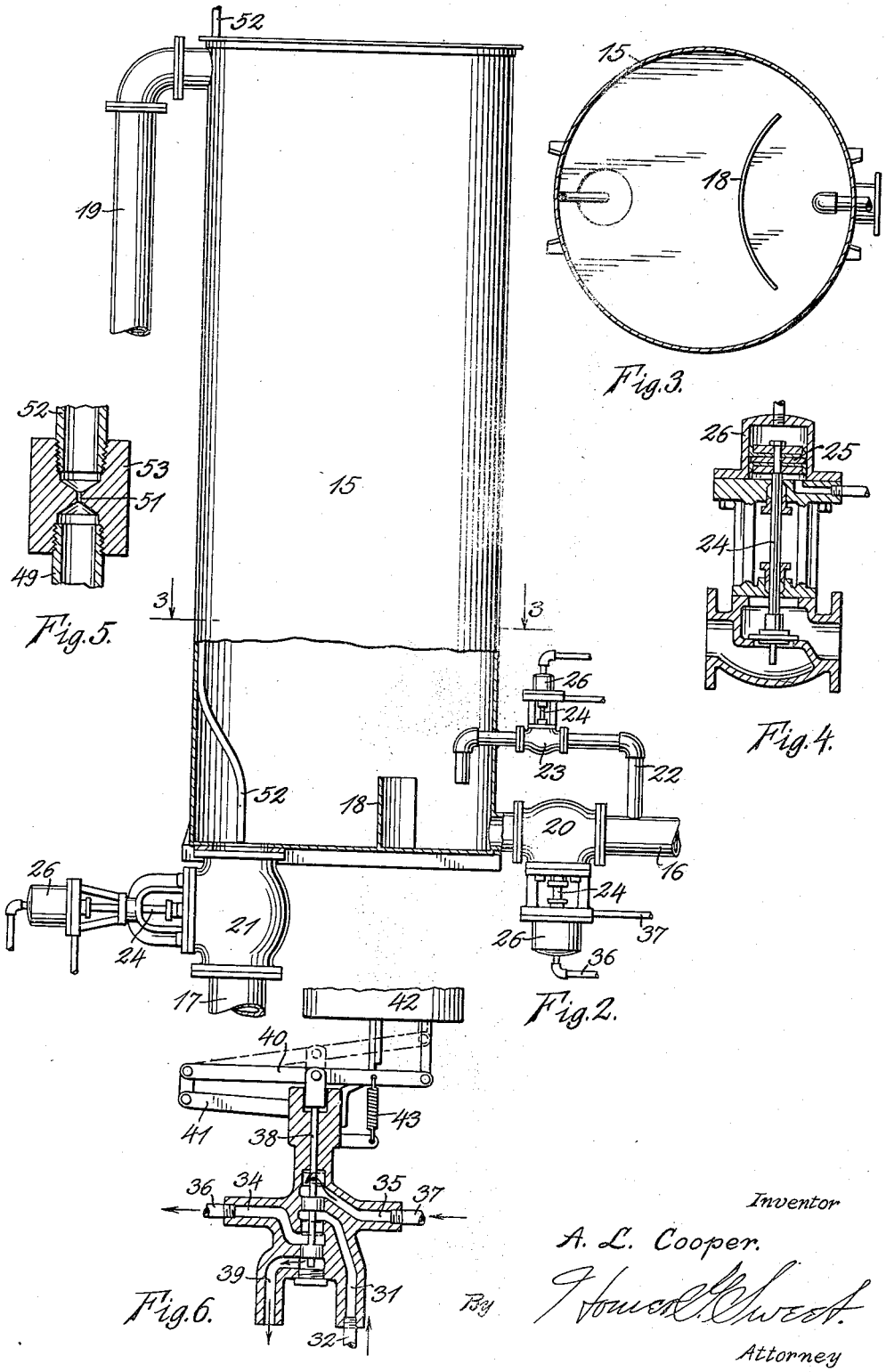

April 16, 1940.　　　A. L. COOPER　　　2,197,204
MEANS FOR WEIGHING MATTER IN A LIQUID VEHICLE
Filed Dec. 13, 1937　　　5 Sheets-Sheet 3

Inventor
A. L. Cooper.
By Homer G. Sweet
Attorney

April 16, 1940.  A. L. COOPER  2,197,204
MEANS FOR WEIGHING MATTER IN A LIQUID VEHICLE
Filed Dec. 13, 1937 5 Sheets-Sheet 4

Inventor
A. L. Cooper.
By Homer G. Sweet.
Attorney

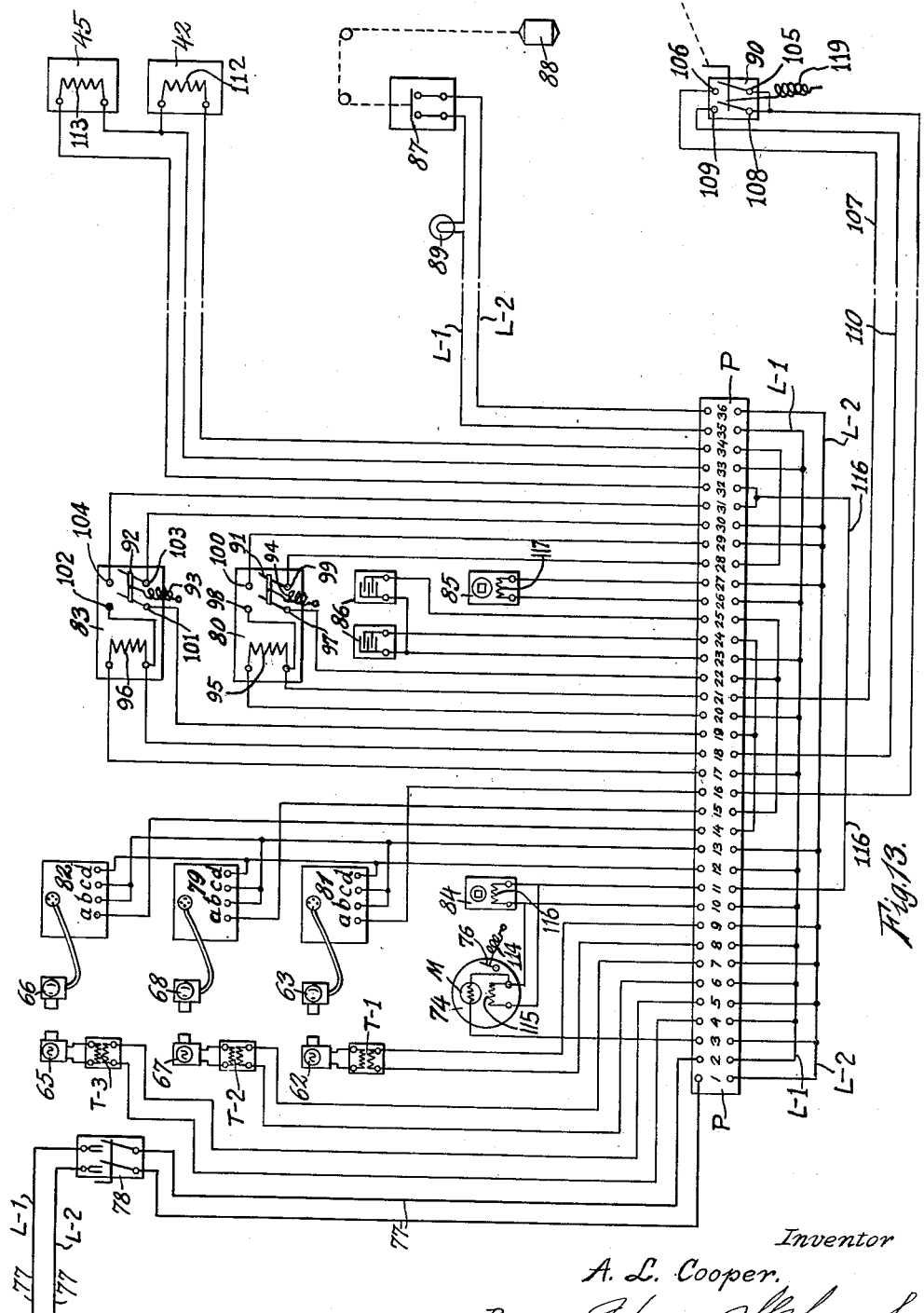

Patented Apr. 16, 1940

2,197,204

UNITED STATES PATENT OFFICE 2,197,204

MEANS FOR WEIGHING MATTER IN A LIQUID VEHICLE

Albert L. Cooper, Colorado Springs, Colo., assignor to Holly Sugar Corporation, Colorado Springs, Colo., a corporation of New York Application December 13, 1937, Serial No. 179,549

5 Claims. (Cl. 73—223)

This invention relates to apparatus for the accurate determination of the quantity of matter in a liquid vehicle, and has as an object to provide an improved means operable to accurately weigh suspended or dissolved matter while in its liquid vehicle.

A further object of the invention is to provide an improved construction and arrangement of apparatus automatically operable to accurately weigh suspended or dissolved matter while in its liquid vehicle.

A further object of the invention is to provide improved apparatus for pneumatically balancing a head of solution against a recording control for the accurate determination of the quantity of matter in a liquid vehicle.

A further object of the invention is to provide improved apparatus for automatically limiting the feed of solution to a measuring tank to a definite "head" of such solution within said tank.

A further object of the invention is to provide improved, pressure-actuated control means in operative combination with a measuring tank, said means being automatically operable to regulate the flow of solution relative to said tank for accurate determination of the quantity of matter carried by the liquid of such solution.

A further object of the invention is to provide improved means for the weighing of matter in a liquid vehicle which is positive, efficient, and accurate in operation, adaptable to a wide variety of specific uses, susceptible of adjustment to fit varying requirements, and which obviates many of the disadvantages of installation, maintenance, and operation inherent in the method and means heretofore employed for the same purpose.

My invention consists in the construction, arrangement, and combination of elements, hereinafter set forth, pointed out in my claims, and illustrated by the accompanying drawings, in which—

Figure 1:
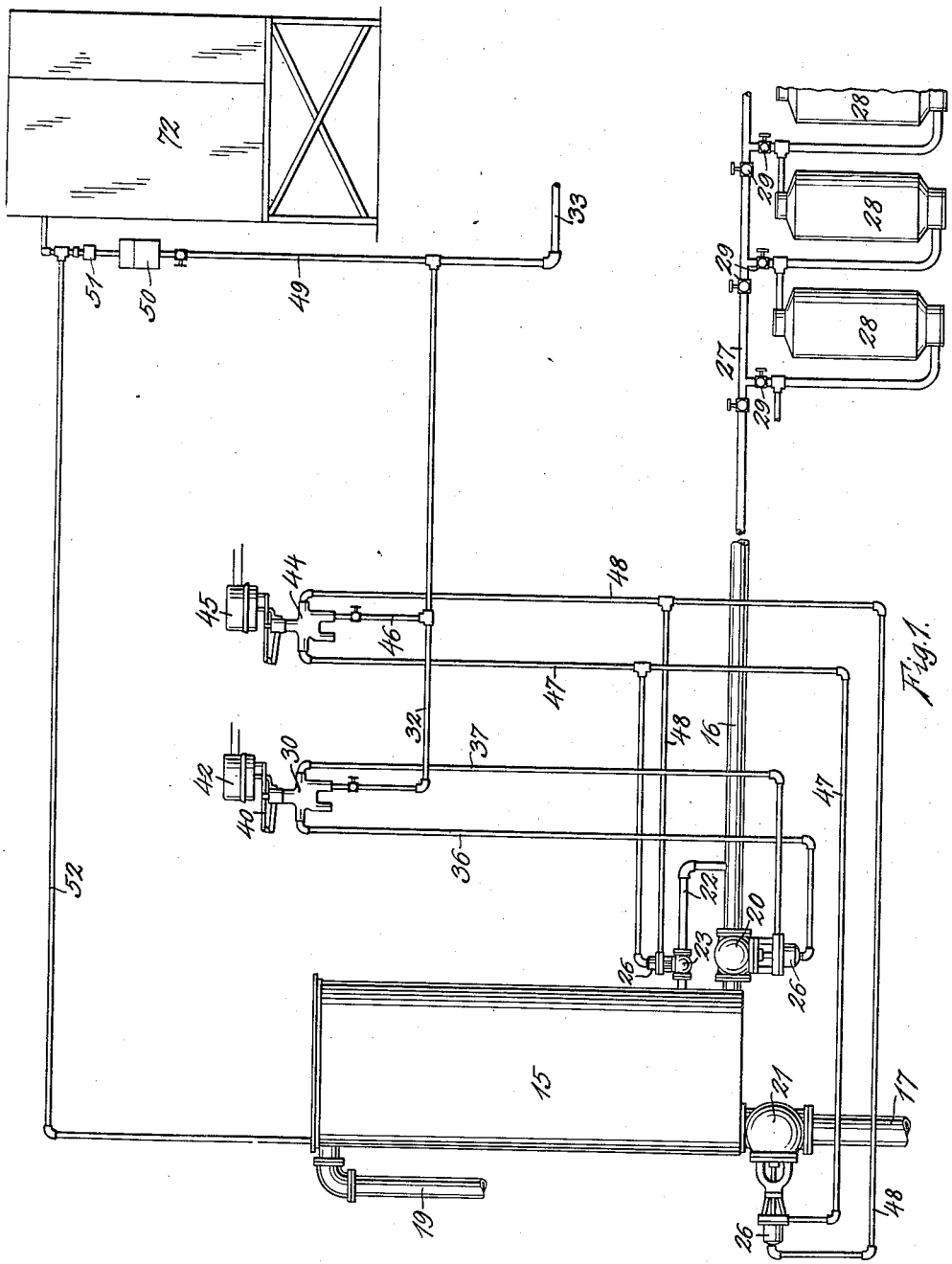
Figures 7, 8:
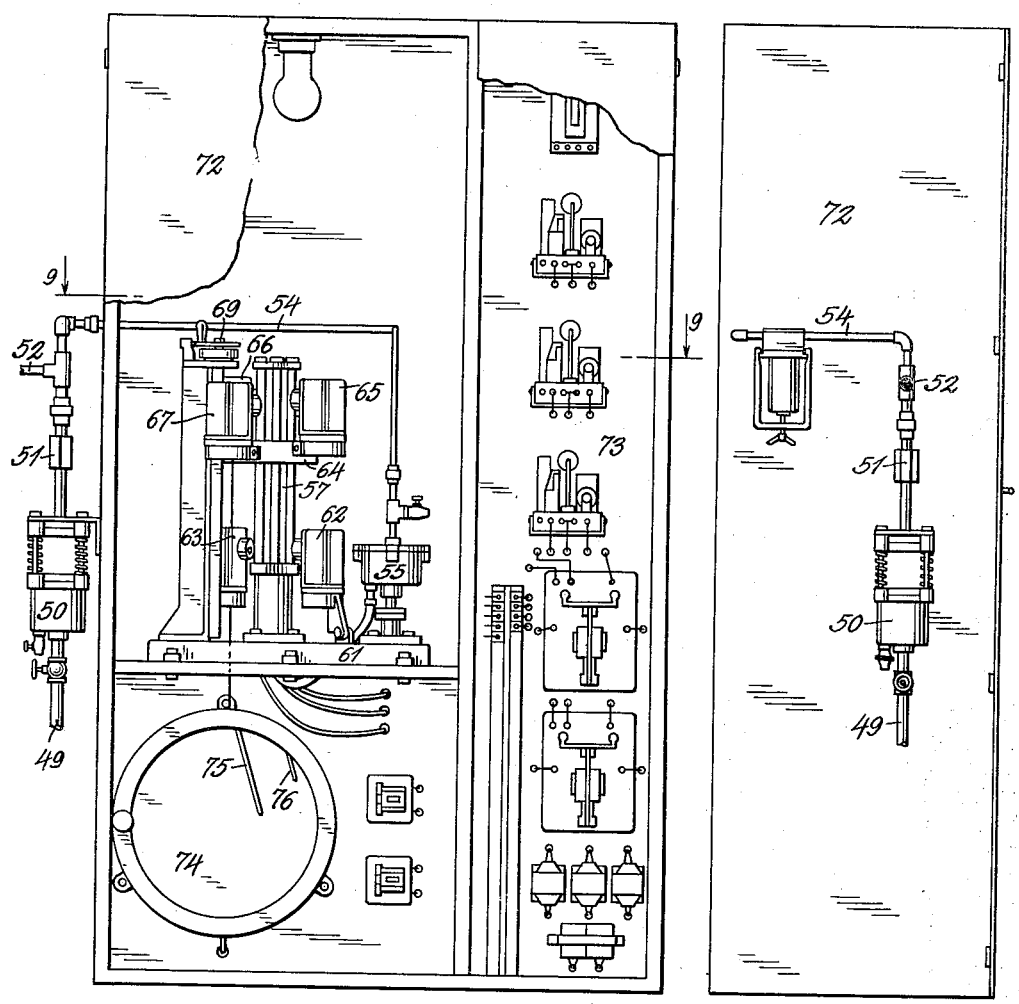
Figure 9:
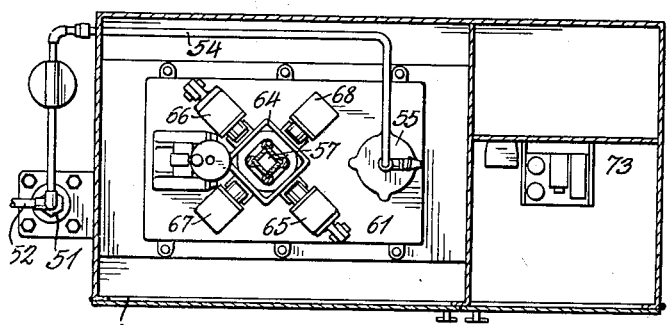
Figures 10, 12:
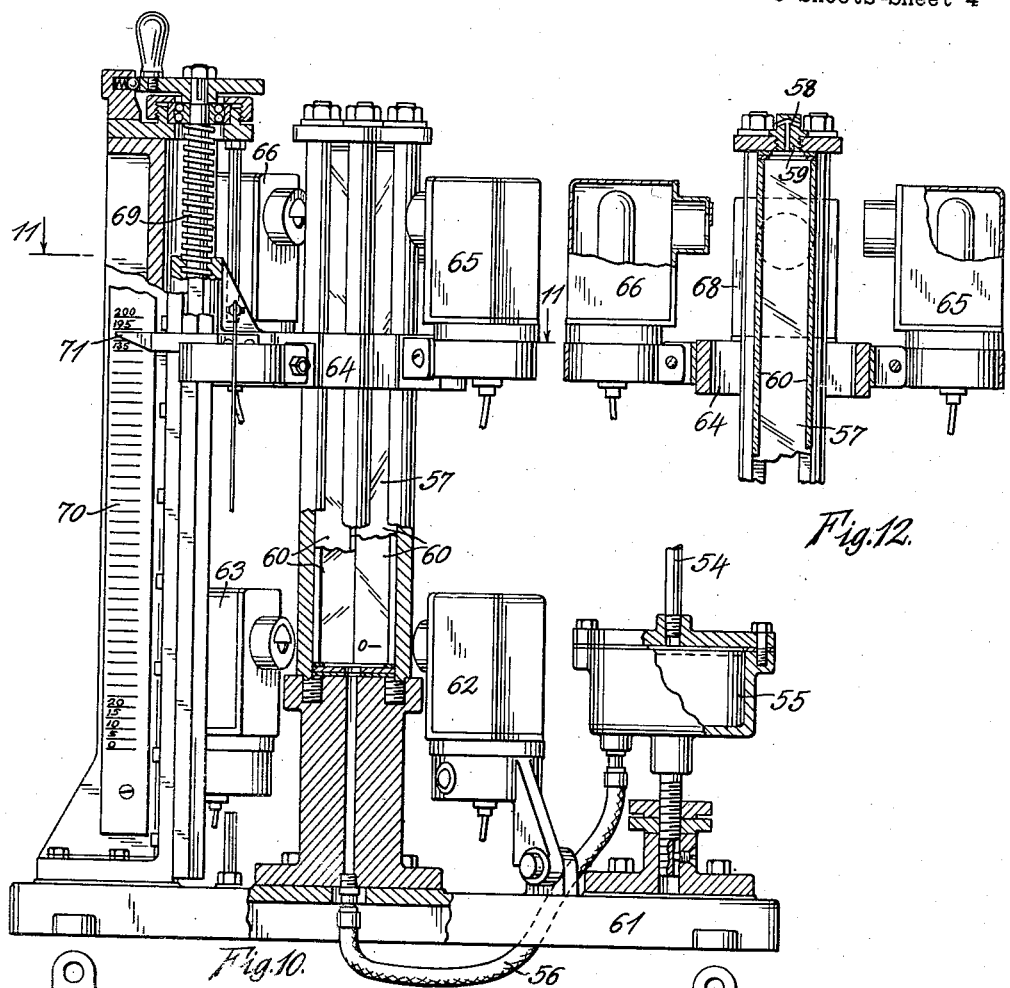
Figure 11:
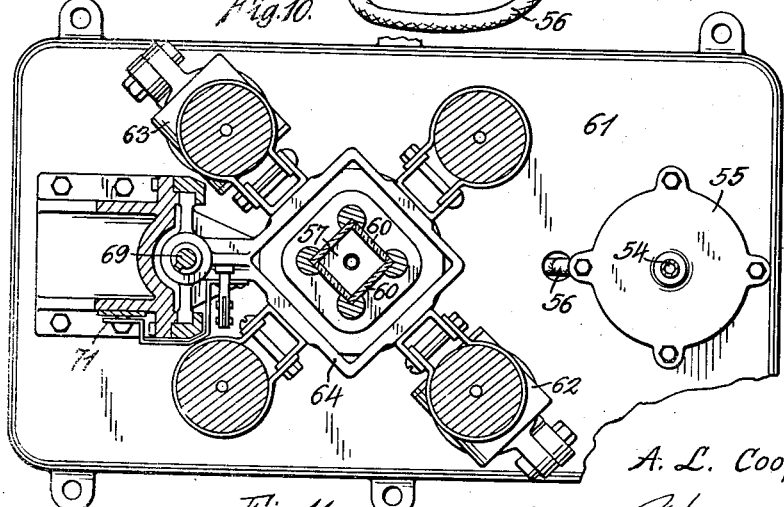

Figure 1 is a diagrammatic view of conventionalized elements as associated and arranged to give practical effect to the principles of the instant invention. Figure 2 is an elevation, partly in section, of an improved construction and arrangement of measuring tank employed in my invention. Figure 3 is a cross section taken on the indicated line 3—3 of Figure 2. Figure 4 is a section longitudinally through a typical valve and associated control means employed to regulate the flow of solution to and from the tank shown in Figure 2. Figure 5 is a fragmentary, detail section longitudinally of a fluid-pressure regulating element employed with other elements of the invention. Figure 6 is a fragmentary, detail section of typical pressure-flow control means employed for the control and actuation of the typical valves illustrated in Figure 4. Figure 7 is an elevation of a cabinet assembly wherein certain control and recording agencies employed with the invention are conveniently grouped. Figure 8 is a side elevation of the showing of Figure 7. Figure 9 is a cross section taken on the indicated line 9—9 of Figure 7. Figure 10 is an elevation, partly in section and on an enlarged scale, of mercury column control means employed in the invention. Figure 11 is a cross section taken on the indicated line 11—11 of Figure 10. Figure 12 is a fragmentary, detail section taken on a plane in angular relation with that of Figure 10 and illustrating certain upper elements of said latter figure. Figure 13 is a conventionalized wiring diagram of the electrical elements, connections, and controls employed in the invention.

In many of the arts, the processes employed involve the combination of the material under treatment with a liquid vehicle prior to the ultimate recovery of such material, and it is frequently of material importance to determine the amount or quantity of such material in the liquid combination. In the art of sugar manufacture, particularly, the sugar content of the source material is first extracted in the form of a water solution, which solution is subsequently treated for the refinement and ultimate recovery of sugar as a commercial product. For various reasons, it is important to determine the amount or quantity of the sugar material available from the source material, and this determination can best be accomplished when the sugar material has first been extracted from the source material. It is the function of the apparatus hereinafter described to effect an accurate determination, preferably in terms of weight, of the material carried by and ultimately to be recovered from a liquid vehicle, and to accomplish such determination while such material is in combination with its liquid vehicle. While the apparatus herein described is specifically related to the art of sugar manufacture, it is to be understood that such relation is but typical of one practical adaptation of the improvement and is in no sense limitative, since the invention is susceptible of operative combination with the processes of other arts to effect an analogous determination of the quantity or amount of other material in a liquid vehicle.

In the construction of the apparatus as shown, the numeral 15 designates a relatively long, preferably cylindrical tank or measuring compartment of uniform cross section adapted to be operatively disposed with its axis vertical. The tank 15 is provided with an inlet port adjacent its bottom and in communication with an inlet conduit 16, wherethrough material in liquid or semi-liquid form may be introduced within said tank. An outlet port opens through the bottom of the tank 15 in spaced relation with the inlet port and communicates with an outlet conduit 17 wherethrough the tank 15 may be entirely drained of its contents, a baffle 18, preferably arcuate in plan, rising vertically from the floor of the tank 15 intermediate the inlet and outlet ports thereof to check the velocity of material fed through the conduit 16 and to operatively separate the inlet and outlet ports of the tank. The tank 15 is preferably open at its top and is provided with an overflow port adjacent its upper end and communicating with an overflow conduit 19 arranged to direct any overflow from the tank to such disposition as may be desired. Flow through the conduits 16 and 17 is controlled by suitable valves 20 and 21, respectively, arranged for automatic regulation as hereinafter described, and a suitable by-pass 22 operatively connects the feed conduit 16 with the interior of the tank 15 in by-passing relation with the valve 20 of said conduit, said by-pass 22 being arranged to discharge within the tank adjacent the inlet port thereof and being provided with a suitable control valve 23 arranged for automatic regulation. The valves 20, 21, and 23, may be of any desired specific construction and arranged for any suitable, automatic regulation, the specific construction illustrated being shown in the typical section of Figure 4, wherein the stem 24 of a typical globe valve is arranged to reciprocate through the valve housing to open and close the passage therethrough, and the outer end of said stem is fixed to a suitable piston 25 sealed to and for reciprocation within a cylinder 26 supported in fixed relation with the valve body, pressure lines communicating with the cylinder 26 on opposite sides of the piston 25 for the introduction of fluid under pressure selectively to either side of said piston for regulation of the valve carried by the stem 24.

When the apparatus is employed in the sugar-making art, the conduit 16 communicates with and is an extension of the outlet header 27 of a battery of diffusion tanks 28. The diffusion tanks 28 have for their function the extraction of the sugar-carrying juice from the source material, and are so arranged as to deliver the extracted juice in a suitable water solution to the outlet header 27, suitable manually-operable valves 29 being associated with the header 27 and positioned between the individual tanks 28 and said header, to control and regulate the discharge from said tanks as may be most expedient or desirable.

The valve 20 is arranged for automatic regulation independently of the valves 21 and 23, which regulation is accomplished through an electrically operated four-way valve assembly 30. The valve assembly 30 has a pressure inlet 31 in constant operative communication through supply lines 32 and 33 with a source of fluid pressure, not shown, and two pressure outlets, 34 and 35, communicating, respectively, through a pressure line 36 with the outer end of the cylinder 26 associated with said valve 20, and through a pressure line 37 with the inner end of said cylinder 26, so that when pressure is delivered through the line 36 the valve 20 is closed and when pressure is delivered through the line 37 the said valve is open. A double valve controlled by a reciprocable stem 38 is provided in the valve assembly 30 and is so arranged as to place the inlet 31 in communication with the outlet 34 when said stem is at one limit of its range of travel, and to place the inlet 31 in communication with the outlet 35 when said stem is at the other limit of its range of travel, the communication between the inlet 31 and outlet 34 being illustrated by the position of the valve elements shown in full lines in Figure 6 and the communication of the inlet 31 with the outlet 35 resulting from the position of the valve elements shown in broken lines in said figure. An exhaust outlet 39 is provided for the valve assembly 30 and is so arranged as to operatively communicate with the pressure outlet 35 and permit exhaustion of fluid pressure through said outlet from the line 37 when the inlet 31 is in communication with the outlet 34, and to communicate with said outlet 34 for exhaustion of fluid pressure from the line 36 through said outlet when the inlet 31 is in communication with the pressure outlet 35, the valve elements actuated by the stem 38 automatically determining the flow of fluid pressure in the assembly 30 according to their relative positions within said assembly. The free end of the stem 38 is hinged to an intermediate portion of a lever arm 40 which is in turn hinged at one end for actuation through a vertical arc to a fixed arm 41 projecting from the valve assembly 30, the free end of the arm 40 being linked to the reciprocable element of a solenoid assembly 42 carried in fixed relation with the valve assembly 30, a retractile spring element 43 preferably connecting between the arm 40 and a fixed element of the valve assembly 30 to yieldably maintain said arm and the valve elements connected therewith at one limit of their range of travel. With the arrangement shown, it is apparent that when the solenoid 42 is energized to move its reciprocable element, the arm 40 is actuated through an arc to move the stem 38 and its associated valve elements from the full line position to the dotted line position shown in Figure 6, and that when the solenoid 42 is deenergized, the spring 43 acts to return the valve elements to their full line position in said figure.

The valves 21 and 23 are arranged for simultaneous actuation for opposite effect, the valve 23 being closed when the valve 21 is open and open when the valve 21 is closed. Regulation of both valves 21 and 23 is accomplished through a solenoid-actuated valve assembly identical with the assembly 30, said second valve assembly being designated by the numeral 44 and its solenoid by the numeral 45. The pressure inlet of the valve assembly 44 communicates through a suitable branch 46 with the supply lines 32 and 33, and one pressure outlet of the valve assembly 44 communicates through a branched pressure line 47 with the outer end of the cylinder 26 controlling the valve 23 and with the inner end of the cylinder 26 controlling the valve 21, while the other pressure outlet of the valve assembly 44 communicates through a branch pressure line 48 with the inner end of the cylinder 26 controlling the valve 23 and with the outer end of the cylinder 26 controlling the valve 21, so that when pressure is introduced into either pressure line 47 or 48 the valves are simultaneously actuated to close the one and open the other.

The contents of the tank 15 is balanced against a mercury column which, through its fluctuations, controls the circuits leading to the solenoids 42 and 45 and consequently the regulation of the valves 20, 21, and 23. To effect the control desired, a fluid pressure line 49 is led from the supply line 33 through a suitable filter 50 and a metering orifice 51 to communication with a pressure line 52 which is extended vertically within the tank 15 to coincidence of its open outlet end with the plane of the tank bottom, the outlet end of the line 52 preferably being disposed, for convenience of adjustment and to minimize obstruction of its outflow, in the open area afforded by the outlet port of the tank 15. The construction of the metering orifice 51 is shown in Figure 5 as comprising a coupling 53 connecting the pressure lines 49 and 52, which coupling is formed with a central web obstructing the communication between said lines and a relatively minute orifice 51 communicating centrally through said web with and between said pressure lines. It is the function of the metering orifice 51 to maintain a uniform feed of air to the line 52, irrespective of pressure fluctuations in the supply line 33 and its branch 49, and this function is accomplished through the relatively small size of the orifice and the consequent slow, uniform rate at which the fluid under pressure is fed to the line 52. A branch pressure line 54 is led from the line 52 and communicates through the top closure of a pot or reservoir 55, adapted to contain mercury, to constantly subject the contents of said pot 55 to the pressure within the line 52. The pot 55 is operatively connected, by means of a flexible conduit 56, with the lower end of a hollow standard assembly 57 wherein mercury from the pot 55 is free to fluctuate against normal atmospheric pressure, the upper end of the standard assembly 57 being provided with channels 58 in its closure member 59 arranged for communication between the interior of said standard assembly and the exterior atmosphere. The standard assembly 57 is preferably square in cross section throughout the operative range of the mercury column provided thereby, and is provided with transparent walls, such as glass plates 60, disposed to form a square, hollow column of uniform cross-sectional area throughout its length. The pot 55 and standard assembly 57 are preferably mounted on a common base 61 to which said pot 55 is secured by means which permit of altitudinal adjustment of the pot relative to the base, so that, under conditions of minimum pressure acting on the pot contents, the level of the mercury column in the standard assembly 57 determined by the level of the mercury in the pot 55 may be varied through adjustment of the pot 55 and its contents to bring the top of the mercury column to a definite altitude above the base 61 and to coincidence with a calibration mark located in the lower end of the transparent portion of said column.

In the operation of the associated elements thus far described, it should be apparent that the pressure lines 52 and 54 operate to balance the head of liquid within the tank 15 against the height of the mercury column within the standard 57 in a manner to at all times directly proportion the height of the mercury column to the head of liquid in the tank. When the tank 15 is empty, there is no resistance to the escape of fluid pressure through the outlet end of the line 52 and a corresponding minimum pressure through the line 54 to the surface of the mercury in the pot 55, in which case the mercury column in the standard 57 drops to its minimum or zero position. As liquid is introduced within the tank 15, the resistance to outflow of fluid pressure through the line 52 is increased, with a consequent and corresponding increase in the pressure through the line 54 acting on the surface of the mercury in the pot 55, which increased pressure acts to displace mercury from said pot and into the standard assembly 57 with a consequent rise of the mercury column in said standard. It is to be noted that the arrangement shown and described proportions the height of the mercury column to the head of the liquid in the tank 15 rather than to its volume, and that, consequently, the same volume of liquids differing in density or specific gravity will be productive of different heights in the mercury column, hence, conversely, uniform heights of the mercury column will derive from differing volumes of differing liquids, when the head exerted by such differing volumes is a constant. Since the head exerted by a given volume of liquid is a function of the liquid mass, the balancing of the mercury column against the liquid head is a measure of the weight of the liquid.

The rise and fall of the mercury column in the standard assembly 57 is employed to actuate the valves controlling the inlet to and outlet from the tank 15 in such a manner as to automatically fill said tank to a predetermined head and thereafter automatically empty the tank completely, the cycle being repeated automatically while a count is kept of the number of tank fillings. To accomplish this automatic regulation of the valves, the mercury column is employed to open and close light paths leading to light-sensitive cells, which may be of any convenient type, in accordance with the circuits employed, such light-sensitive elements being hereinafter referred to in general as "photocells." As is clearly shown in the drawings, a light source is mounted in a suitable housing 62 hingedly supported by the base 61 and so positioned and arranged as to direct a beam of light from said source perpendicularly through the transparent plates 60 of the housing assembly at the minimum pressure or zero calibration of the mercury column, and a suitable photocell is disposed within a similar suitable housing 63 hingedly bracket-mounted on the base 61 on the side of the column opposite from the housing 62, and is arranged to receive and react to the light emanating from the source within said latter housing. The light-receiving aperture of the housing 63 is so arranged as to permit light to traverse the transparent portion of the mercury column housing for energization of the photocell when the mercury column is at its zero point, and to cut off the light from the photocell when the mercury column rises above said zero point. Bracket-mounted above the base 61 in surrounding relation with the standard assembly 57 and arranged for convenient manual altitudinal adjustment, a carrier frame 64 supports a suitable source of light in a housing 65 similar to the housing 62 arranged to direct light from said source transversely through the upper portion of the transparent mercury column housing, and a photocell in a suitable housing 66 similar to the housing 63 and arranged to receive and react to light emanating from the source within the housing 65. The carrier 64 supports a second light source in a housing 67 arranged to project a second beam of light through the upper portion of the mercury column housing in perpendicular relation with and at a level slightly below that of the light emanations from the housing 65, and a second photocell is mounted on the carrier 64 within a suitable housing 68 in position to receive and react to the emanations from the light source within the housing 67.

The carrier assembly 64 is engaged and positioned by a manually-rotatable, vertically-disposed screw 69 whereby the assembly and the paired light sources and photocells carried thereby may be adjusted to vary the points at which the mercury column effects opening and closing of the valves 20, 21 and 23, and consequently to vary the head within the tank 15 which is attained during each filling of the tank, a suitably calibrated scale 70 preferably being fixed to the bracket supporting the carrier assembly 64 for cooperation with a gauge finger 71 fixed to and projecting across said scale from the carrier assembly for convenience in reading the head at which or to which the apparatus is set.

For convenience and for protection of the apparatus, the base 61 carrying the mercury column and associated elements are preferably housed within a suitable cabinet enclosure 72 which also contains an electrical panel 73 whereon are grouped the circuit terminals and electrical elements employed. The mercury column assembly is preferably operatively associated with a recording unit assembly 74, of conventional type, whereon one scribing arm 75 is directly linked with the carrier assembly 64 to continuously record the head reading with which the apparatus is set to function, and a second scribing arm 76 is electrically linked with one of the electrical circuits of the apparatus in a manner to record the number of tank fillings completed through operation of the apparatus.

The electrical apparatus and connections employed in the invention are shown in one preferred operative grouping in the diagram of Figure 13, wherein the leads 77 indicate connections from a reliable source of electrical energy through a suitable circuit breaker 78 to supply the current necessary for actuation of the electrical apparatus connected therewith. Since the discharge from the tank 15 passes to other tanks and apparatus having definite capacity limitations, it is desirable to know at all times whether there is sufficient capacity available in such tanks and apparatus to receive further supply from the tank 15, to which end a suitable switch 87, controlled by a float 88 positioned in the tank or reservoir that receives the discharge from the tank 15 is connected in a branch of the supply circuit 77 which includes a signal light 89, and is so arranged as to close said circuit and energize the signal light 89 when the capacity of the succeeding apparatus is insufficient to accommodate additional supply from the tank 15.

In the operation of the apparatus described, air or similar gaseous fluid is continuously supplied, under pressure, through the line 33 and acts, when the tank 15 is empty, through the valve assemblies 30 and 44 to close the valve 21 and to open the valves 20 and 23, the empty condition of the tank 15 resulting in a minimum pressure condition through the lines 52 and 54 with a consequent positioning of the mercury column at its zero point for reaction of the photocell 63 to light from the source 62 and resulting actuation of the solenoids 42 and 45 for the valve regulation as just set forth. With the elements of the apparatus positioned as described, opening of the valve communicating between the conduit 16 and header 27 permits flow of material from the diffusion tanks 28 to the tank 15, which flow continues to fill said tank 15 until the head developed in said tank acts through the lines 52 and 54 to raise the level of the mercury in the standard assembly 57 sufficiently to cut off the rays from the light source 67 acting on the selenium cell 68, such action resulting in de-energization of the solenoid 42 to close the inlet valve 20. An inflow, reduced in quantity, continues into the tank 15 through the by-pass 22 and valve 23 and augments the head developed within said tank with a further rise of the mercury column to interruption of the light rays from the source 65 to the photocell 66, which interruption de-energizes the solenoid 45 and consequent closing of the valve 23 and simultaneous opening of the valve 21, arresting all flow of material to the tank 15 and permitting said tank to empty its contents through the conduit 17. As the head in the tank 15 decreases, the height of the mercury column decreases until, when the tank is empty, the mercury column is at its zero point and light rays from the source 62 act on the photocell 63 to energize the solenoids 42 and 45 and simultaneously close the valve 21 and open the valves 20 and 23, for repetition of the cycle. Knowing the head to which the tank has been filled, as determined by the setting of the carrier assembly 64 and as recorded by the scribing arm 75, and having a record provided by the scribing arm 76 of the number of times the tank 15 has been filled to the predetermined head, analysis of the flow from the header 27 to the tank 15 is all that is required to determine the amount of material in the liquid vehicle that has passed through the tank 15, hence a simple and convenient method is provided for accurately determining the weight of the material under treatment, while in the liquid vehicle, without interruption of the processes to which such material is subjected and without the necessity for a step by step, or batch, weighing method of a type that would interrupt the continuity of the material flow.

I will now describe more in detail the electric circuits involved, and their association with other apparatus shown in the drawings and hereinabove mentioned, and their functions in connection with the performance of the various operations hereinabove referred to. In this connection reference will be had to the circuit diagram of Figure 13.

In the practical application of the invention in the process of sugar manufacture, it has been found convenient that switch 90 be a momentary contact switch normally held open by spring 119, and susceptible of being closed by a cable, indicated by the reference numeral 118, within convenient reach of the attendant having charge of the battery of diffusion tanks 28, for the initiation of each cycle separately.

Supply leads 77 are distinguished from each other by the additional designations L—1 and L—2. Said leads may deliver the usual 110-volt 60-cycle current, in which case the various electrical devices are of types responsive thereto. The light sources 62, 67 and 65 receive current from supply circuit 77 (in the arrangement shown, through transformers T—1, T—2 and T—3) for continuous operation. The numerals 63, 68 and 66, hereinabove used to designate the photocell housings, will also be used to designate the photocells contained therein and operatively associated with photo-electric relay units 81, 79 and 82 respectively. Each of said photo-electric relay units is provided with terminals designated on its diagrammatic representation as a, b, c, and d, and in referring to said terminals they will be identified by prefixing to their letter designations the numeral in each case designating the photo-electric unit to which each pertains.

Said photo-electric relay units are connected in parallel across conductors leading to terminals 12 and 13 on the terminal panel P, thence to supply leads L—1 and L—2 respectively, said conductors furnishing current to each of said photo-electric relay units to render it operative, through its terminals c and d. Photo-electric relays are so well known that the relay units here indicated are sufficiently described by saying that energization of either of said photocells establishes a conductive path between terminals a and b of its associated photo-electric relay unit, and that terminal b of each of said units is connected with L—2 through the conductor leading to panel terminal 13, as indicated in the drawing, so that any suitable electrical apparatus appropriately connected between terminal a of either of said photo-electric relay units and L—1 will, when the photocell associated with such photo-electric relay unit is energized, be actuated by current flow between L—1 and L—2.

Numerals 80 and 83 designate 2-pole magnetic relays, the respective armatures 91 and 92 of which are retracted by springs 94 and 93 respectively in the absence of current through coils 95 and 96 respectively. Currents through said coils electro-magnetically attract armatures 91 and 92 respectively, which thereupon establish conductive paths between contacts 97 and 98 and between contacts 99 and 100 of relay 80, and between contacts 101 and 102 and between contacts 103 and 104 of relay 83, respectively.

It will be obvious that the closing of magnetic relay 80 energizes solenoid 42, and the closing of magnetic relay 83 energizes solenoid 45, and said solenoids control valves 20, 21 and 23 thus: Energization of solenoid 42 and of solenoid 45 closes valve 21 and opens valves 20 and 23, and tank 15 commences to fill; energization of solenoid 45 and de-energization of solenoid 42 keeps valve 21 closed and valve 23 open, and closes valve 20, and said tank continues to fill, but more slowly; de-energization of solenoid 42 and of solenoid 45 keeps valve 20 closed, closes valve 23, and opens valve 21, and said tank commences to empty. To effect and maintain these three combinations of valve positions the following circuits (hereinafter mentioned in connection with the letters preceding their respective descriptions) are controlled by said mercury column:

(A) The closing circuit for magnetic relay 80 is: From supply lead L—2 to panel terminal 13, to photo-electric relay terminal 81—b, to 81—a, to panel terminal 16, to switch 90 and through contacts 105 and 106 thereof, through conductor 107, to panel terminal 21, to magnetic relay 80 and through its coil 95, to panel terminal 20, to supply lead L—1. This circuit is closed only while switch 90 is closed and photocell 63 is energized.

(B) The closing circuit for magnetic relay 83 is: From supply lead L—2 to panel terminal 13, to photo-electric relay terminal 81—b, to 81—a, to panel terminal 16, to switch 90 and through contacts 108 and 109 thereof, through conductor 110 to panel terminal 18, to magnetic relay 83 and through its coil 96, to panel terminal 17, to supply lead L—1. This circuit is closed only while switch 90 is closed and photocell 63 is energized.

(C) The holding circuit for magnetic relay 80 is: From supply lead L—2 to panel terminal 13, to photo-electric relay terminal 79—b, to 79—a, to panel terminal 15, to panel terminal 22, to magnetic relay 80 and through contacts 97 and 98 and coil 95, to panel terminal 20, to supply lead L—1. This circuit C closes only if photocell 68 is energized while the closing circuit A for magnetic relay 80 is closed, but remains closed so long as photocell 68 remains energized, regardless of the opening of circuit A.

(D) The holding circuit for magnetic relay 83 is: From supply lead L—2 to panel terminal 13, to photo-electric relay terminal 82—b, to 82—a, to panel terminal 14, to panel terminal 19, to magnetic relay 83 and through contacts 101 and 102 and coil 96, to panel terminal 17, to supply lead L—1. The circuit D closes only if photocell 66 is energized while the closing circuit B for magnetic relay 83 is closed, but remains closed so long as photocell 66 remains energized, regardless of the opening of circuit B.

(E) The circuit energizing solenoid 42 when relay 80 is closed is: From supply lead L—2 to panel terminal 29, to relay 80 and through contacts 99 and 100, to panel terminal 28, to panel terminal 34, to solenoid 42 and through its coil 112, to panel terminal 33, to supply lead L—1.

(F) The circuit energizing solenoid 45 when relay 83 is closed is: From supply lead L—2 to panel terminal 30, to relay 83 and through contacts 103 and 104, to panel terminal 31, to panel terminal 32, to solenoid 45 and through its coil 113, to panel terminal 33, to supply lead L—1.

The cycle of operations in filling and emptying tank 15 are: While tank 15 is empty, the mercury column thus being at minimum height, and while valve 21 is open and valves 20 and 23 are closed, let light sources 62, 67 and 65 be energized, thereby energizing photocells 63, 68 and 66, and let switch 90 be closed momentarily. Thereupon the closing circuits A and B for relays 80 and 83 close and close said relays, which close the energizing circuits E and F for solenoids 42 and 45 and thereby energize said solenoids, which close valve 21 and open valves 20 and 23, and said tank commences to fill. The closing of relays 80 and 83 also closes their respective holding circuits C and D. As the mercury rises with the filling of the tank and interrupts the light between 67 and 68 and thus breaks the holding circuit C for relay 80, relay 80 opens, the energizing circuit E for solenoid 42 is broken, solenoid 42 is de-energized and valve 20 closes, valve 23 remains open, and said tank continues to fill, but more slowly. As the mercury rises further with the filling of the tank and interrupts the light between 65 and 66 and thus breaks the holding circuit D for relay 83, relay 83 opens, the energizing circuit F for solenoid 45 is broken, solenoid 45 is de-energized, valve 23 closes, valve 21 opens, and said tank commences to empty and the mercury falls accordingly. However, the opening of the light paths between 65 and 66 and between 67 and 68, in consequence of the continued fall of the mercury, leaves relays 80 and 83 open, because their coils 95 and 96 are not in closed circuits, and solenoids 42 and 45 remain de-energized. Thus tank 15 continues to empty and the mercury continues to fall until light path between 62 and 63 is restored, whereupon photocell 63 is again energized, switch 90 is again closed momentarily, and the cycle is repeated.

As shown in Figure 7, the recording unit 74 includes two scribing arms making a record on a revolving disc, the circuits associated with said disc and scribing arm 76 being indicated in Figure 13. Said disc is slowly and continuously revolved by a current-responsive movement M of conventional type, the circuit being: From supply lead L—2 to panel terminal 3, to movement M and through the interior circuit actuating said movement M, to panel terminal 10, to supply lead L—1. Scribing arm 76 is retracted by spring 114 in the absence of current in coil 115, but a current through coil 115 electro-magnetically attracts scribing arm 76, the circuit being: From supply lead L—1 to panel terminal 10, through coil 115, to panel terminal 11, through conductor 116 to panel terminal 31, to relay 83 and through contacts 104 and 103 to panel terminal 30, to supply lead L—2. It is obvious that current flows in this circuit only during the periods in which solenoid 45 is energized, and that scribing arm 76 records successive energizations and de-energizations of solenoid 45, such de-energizations normally corresponding to the draws from tank 15.

For convenience, a magnetic counter 84, of conventional type, is also provided to register the draws from said tank, the circuit actuating said counter being: From supply lead L—1 to panel terminal 10, to said counter and through its interior actuating circuit 116, to panel terminal 11, through conductor 116 to panel terminal 31, to relay 83 and through contacts 104 and 103, to panel terminal 30, to supply lead L—2. Any interruptions of current supply through leads L—1 and L—2 are registered by a magnetic counter 85, of the same type as counter 84, the circuit actuating said counter 85 being: From supply lead L—1 to panel terminal 26, to said counter 85 and through its interior actuating circuit 117, to panel terminal 27, to supply lead L—2.

Condensers 86 do not form an essential part of the invention, but are connected in the usual manner to minimize the sparking of relays, which may be of the usual telephone type and which may be integral parts of the photo-electric relays 79 and 82.

Since many changes, variations, and modifications in the specific character, and/or in the specific construction, arrangement, and combination of the structural elements illustrated and described, may be had without departing from the spirit of the invention, I wish to be understood as being limited solely by the scope of the appended claims, rather than by any details of the illustrative showing and foregoing description.

I claim as my invention—

1. Means for weighing matter in a liquid vehicle comprising, a tank, inlet and outlet conduits communicating with said tank wherethrough the latter may be repetitiously charged with liquid containing the matter to be weighed, valves controlling said inlet and outlet conduits, a valve-controlled by-pass of relatively reduced size communicating between said inlet conduit and tank about said inlet valve, an altitudinally-variable control column balanced against the liquid contents of said tank, whereby the height of said column is proportioned to the head of liquid in said tank, means automatically operable through said control column to open the inlet and by-pass valves and close the outlet valve of said tank when said column is at the limit of its altitudinal variation corresponding with an empty condition of said tank, similar means automatically operable through said control column to close said inlet valve as the control column approaches a limit of its altitudinal variation corresponding with a predetermined specific head of liquid in said tank, further similar means automatically operable through said control column to close said by-pass valve and simultaneously open said outlet valve when said column attains that limit of its altitudinal variation corresponding with said predetermined specific head of liquid, and means for automatically recording the number of flow cycles had through said tank.

2. Means for weighing matter in a liquid vehicle comprising, a tank, inlet and outlet conduits communicating with said tank, valves controlling said inlet and outlet conduits, a valve-controlled by-pass conduit of relatively reduced size communicating between said inlet conduit and tank about said inlet valve, an altitudinally-variable control column pneumatically balanced against the contents of said tank, whereby the height of said column is proportioned to the head of liquid within said tank, means automatically operable through said control column at that limit of its range of altitudinal variation corresponding with an empty condition of said tank to close said outlet valve and simultaneously open said inlet and by-pass valves for flow of liquid into said tank, similar means altitudinally adjustable along said control column and automaticaly operable therethrough as said column approaches that limit of its altitudinal variation corresponding with a predetermined head of liquid in said tank to close said inlet valve, further similar means altitudinally adjustable with said last named means and automatically operable through said column at that limit of column altitudinal variation corresponding with said predetermined head of liquid to close said by-pass valve and simultaneously open said outlet valve, and means automatically operable to record the number of flow cycles had through said tank.

3. Means for weighing matter in a liquid vehicle comprising, a tank, inlet and outlet conduits communicating with said tank, valves controlling said inlet and outlet conduits, a valve-controlled by-pass communicating between said inlet conduit and tank about said inlet valve, an altitudinally-variable controlled column balanced against the contents of said tank, whereby the height of said column is proportioned to the head of liquid within said tank, means automatically operable through said control column at that limit of its range of altitudinal variation corresponding with an empty condition of said tank to close said outlet valve and simultaneously open said inlet and by-pass valves for flow of liquid into said tank, similar means altitudinally adjustable along said control column progressively and automatically operable therethrough as said control column approaches and reaches a limit of its altitudinal variation corresponding with a predetermined head of liquid in said tank to first close said inlet valve and subsequently close said by-pass valve and simultaneously open said outlet valve, said latter means being conjointly adjustable along said control column for determination of that specific head of liquid representing a maximum tank charge, and means automatically operable through actuation of said valve-operating means to record the number of flow cycles had through said tank.

4. Apparatus of the character described comprising a tank, inlet and outlet means communicating with said tank for enabling liquid to flow into and out of said tank, light sensitive means responsive to an empty condition of said tank for closing said outlet means and opening said inlet means, light sensitive means responsive to approach of said liquid to a predetermined head for operating said inlet means to restrict the flow of liquid into said tank, and light sensitive means responsive to the attainment of said predetermined head for completely closing said inlet means and opening said outlet means.

5. In apparatus of the character described, a tank, inlet and outlet means communicating with said tank, means responsive to varying heads of liquid in said tank, light-sensitive means controlled by said head-responsive means for closing an electric circuit to cause opening of said inlet means to admit liquid to said tank and for causing closing of said outlet means in response to a predetermined value of liquid head, means for maintaining said circuit closed until the liquid head reaches a predetermined value, and light-sensitive means responsive to said predetermined value for breaking said circuit and for causing closing of said inlet means and opening of said outlet means.

ALBERT L. COOPER.